(12) United States Patent
Anderson et al.

(10) Patent No.: US 8,918,445 B2
(45) Date of Patent: Dec. 23, 2014

(54) CIRCUIT WHICH PERFORMS SPLIT PRECISION, SIGNED/UNSIGNED, FIXED AND FLOATING POINT, REAL AND COMPLEX MULTIPLICATION

(75) Inventors: Timothy David Anderson, Dallas, TX (US); Mujibur Rahman, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 433 days.

(21) Appl. No.: 13/239,076

(22) Filed: Sep. 21, 2011

(65) Prior Publication Data

US 2012/0191767 A1 Jul. 26, 2012

Related U.S. Application Data

(60) Provisional application No. 61/384,932, filed on Sep. 21, 2010.

(51) Int. Cl.
*G06F 7/44* (2006.01)
*G06F 13/366* (2006.01)

(52) U.S. Cl.
CPC .................................. *G06F 13/366* (2013.01)
USPC ........................... 708/503; 708/495; 708/497

(58) Field of Classification Search
None
See application file for complete search history.

(56) References Cited

U.S. PATENT DOCUMENTS 6,115,732 A * 9/2000 Oberman et al. ............. 708/625
2002/0194239 A1* 12/2002 Pangal .......................... 708/498

* cited by examiner

*Primary Examiner* — Michael D Yaary
(74) *Attorney, Agent, or Firm* — Robert D. Marshall, Jr.; Frederick J. Telecky, Jr.

(57) ABSTRACT

An integrated multiplier circuit that operates on a variety of data formats including integer fixed point, signed or unsigned, real or complex, 8 bit, 16 bit or 32 bit as well as floating point data that may be single precision real, single precision complex or double precision. The circuit uses a single set of multiplier arrays to perform 16×16, 32×32 and 64×64 multiplies, 32×32 and 64×64 complex multiplies, 32×32 and 64×64 complex multiplies with one operand conjugated.

4 Claims, 5 Drawing Sheets

US 8,918,445 B2

CIRCUIT WHICH PERFORMS SPLIT PRECISION, SIGNED/UNSIGNED, FIXED AND FLOATING POINT, REAL AND COMPLEX MULTIPLICATION

CLAIM OF PRIORITY

This application claims priority under 35 USC 119(e)(1) to U.S. Provisional Application No. 61/384,932 filed Sep. 21, 2010.

TECHNICAL FIELD OF THE INVENTION

This invention relates in general to the field of computing systems and more particularly to arithmetic processing units.

BACKGROUND OF THE INVENTION

High performance Digital Signal Processors (DSP) require the flexibility to operate on many different formats of data. Data may be integer fixed point data—signed or unsigned, real or complex, 32-bit, 16-bit or 8-bit. Or it may be floating point data—single-precision real, single-precision complex, or double precision. In the prior art, separate computational units were required to do fixed or floating point arithmetic, and to process real or complex data formats.

SUMMARY OF THE INVENTION

This invention describes a single computational unit capable of performing operations on fixed point real, complex and floating point data formats in the same circuit. This optimizes circuit implementation and minimizes the circuit area when compared to separate fixed and floating point multipliers.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
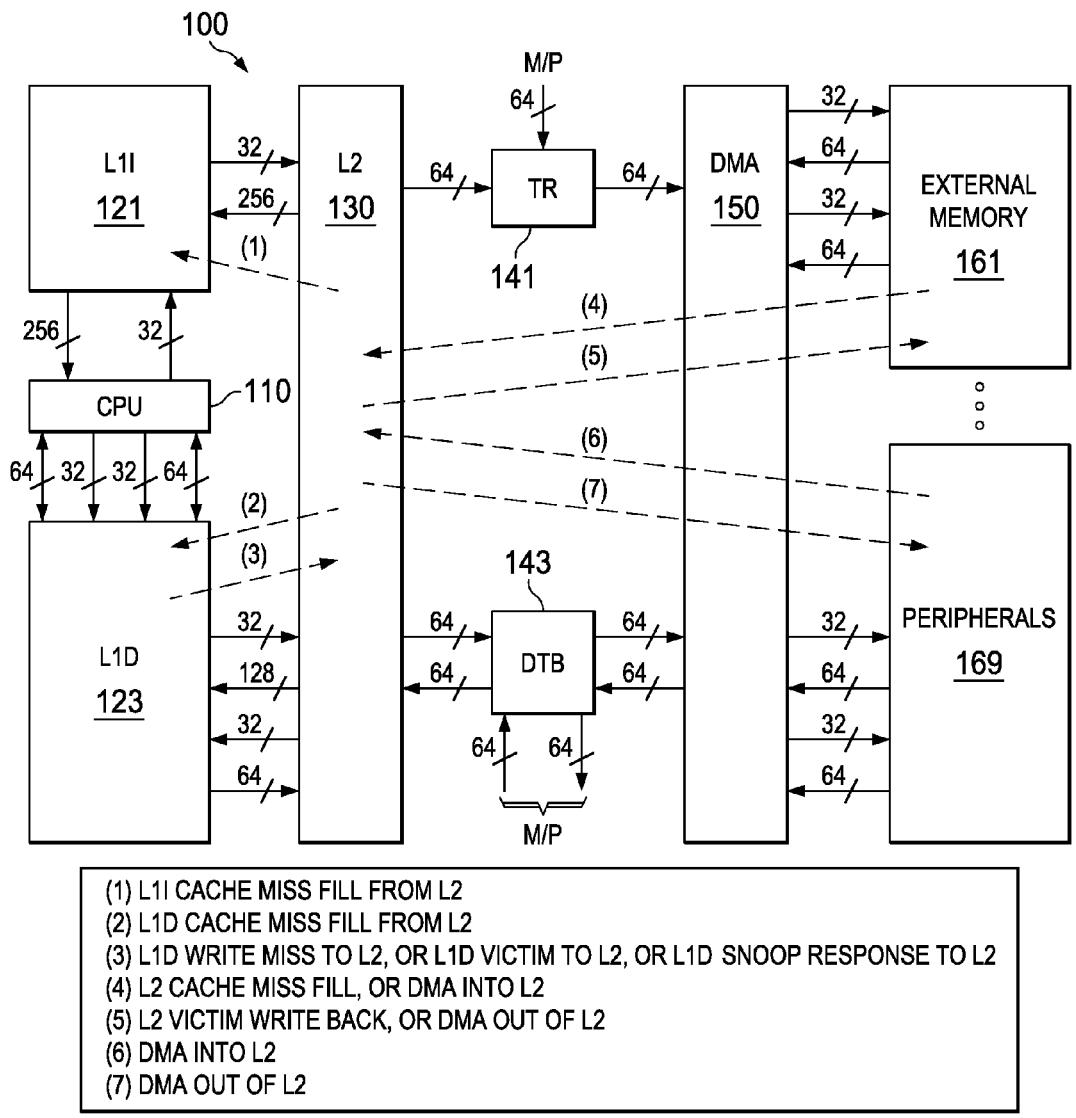
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
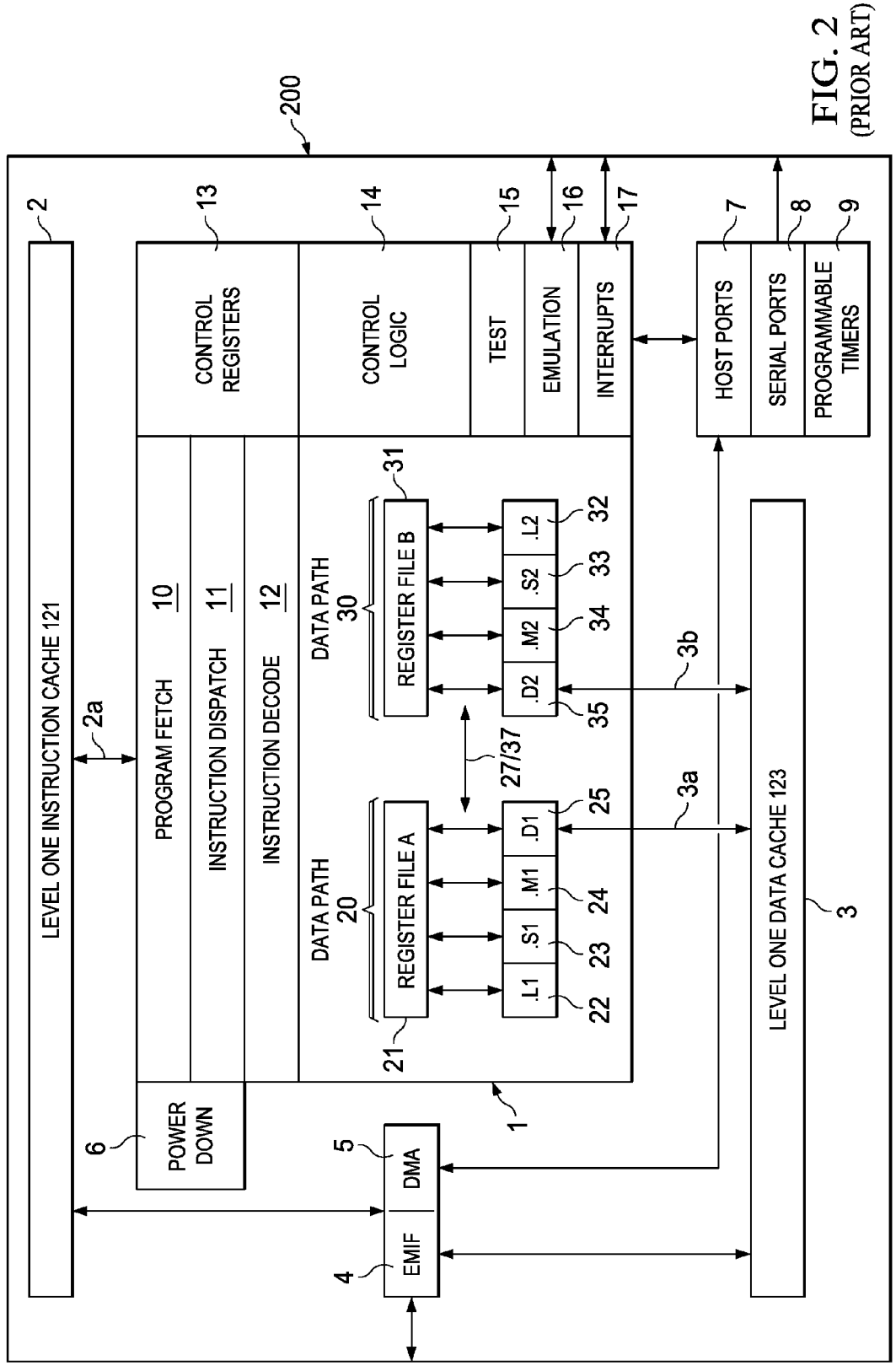
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
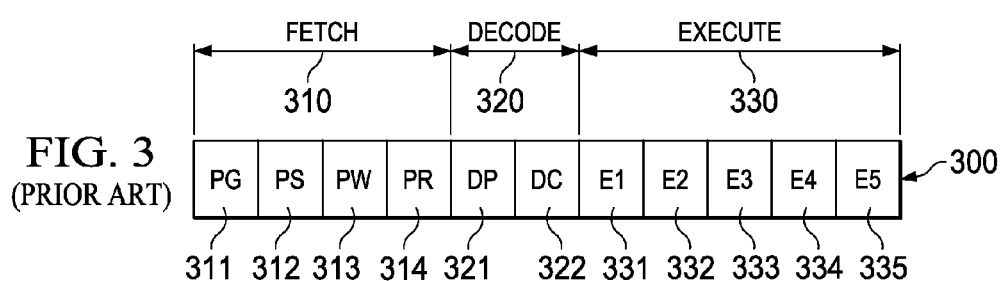
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figure 4:
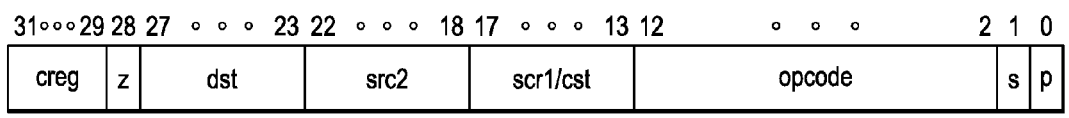
FIG. 4 illustrates the instruction syntax of the very long instruction word digital signal processor core illustrated in FIG. 2 (prior art) and FIG. 5 illustrates the block diagram of the multiplier circuit.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

The multiplier circuit of this invention comprises four clusters of multipliers. Each cluster contains four 16×16 bit multipliers with internal masking logic capable of converting the multiplier into a multiplier that will produce two 8×8 bit results.

The groups of 4 16×16 multipliers feed a set of multiplexers, followed by a 6:2 compressor to provide the following outputs with optional rounding terms also included in the multiplexing 2 16×16 multiplies 1 32×32 multiply 1 32×32 complex multiply (16 bits real, 16 bits imaginary)

1 32×32 complex multiply, with one operand conjugated

Following the 6:2 compressor, there is an additional 6:2 compressor which may be used to generate the following outputs 1 64×64 multiply (needed for double precision)

1 64×64 complex multiply (32 bit real, 32 bits imaginary)

1 64×64 complex multiply with one operand conjugated.

Figure 5:
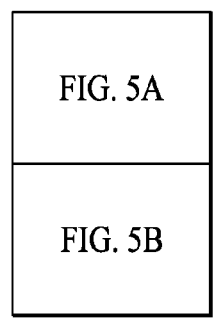
Figure 5A:
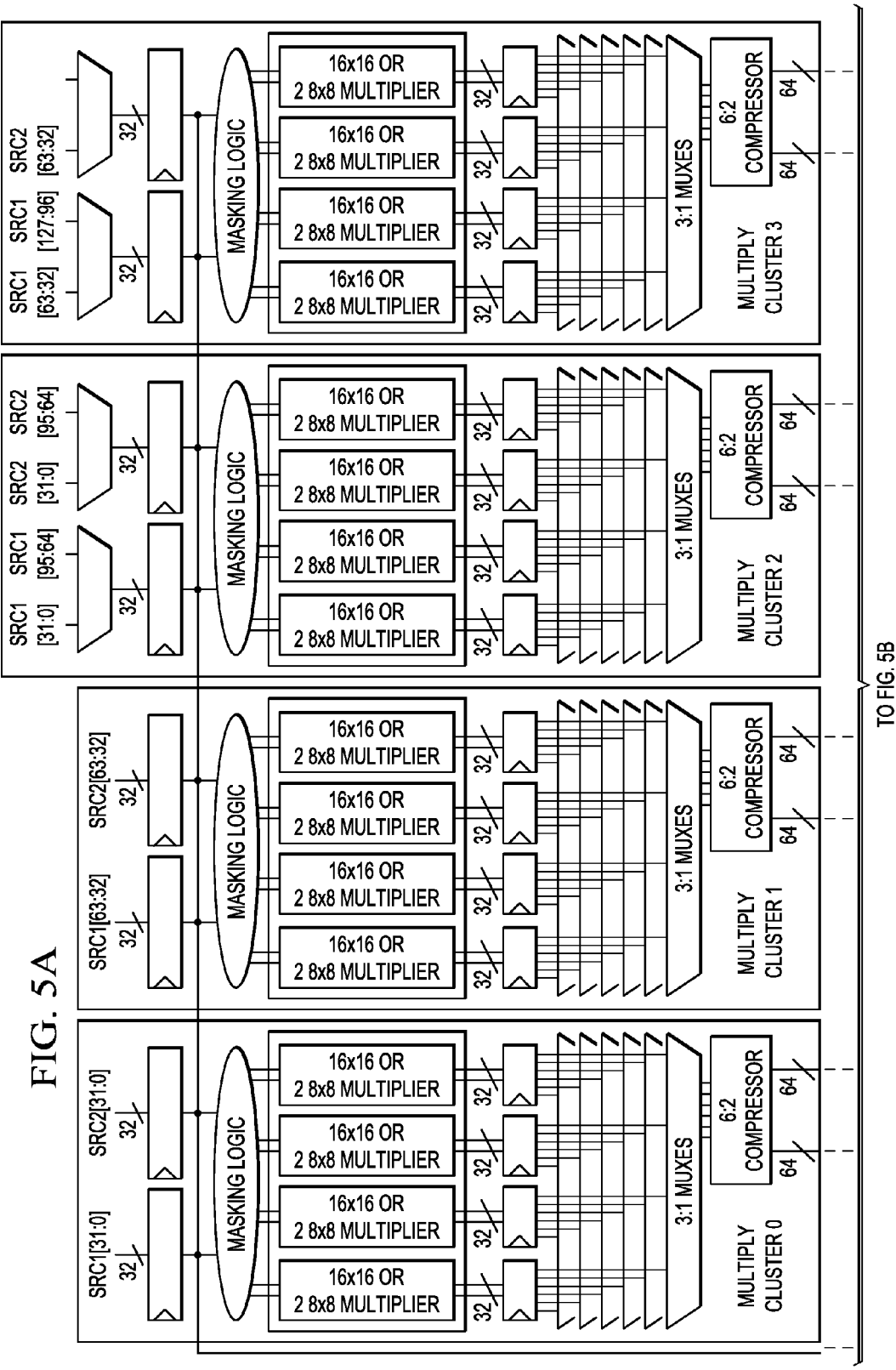
Figure 5B:
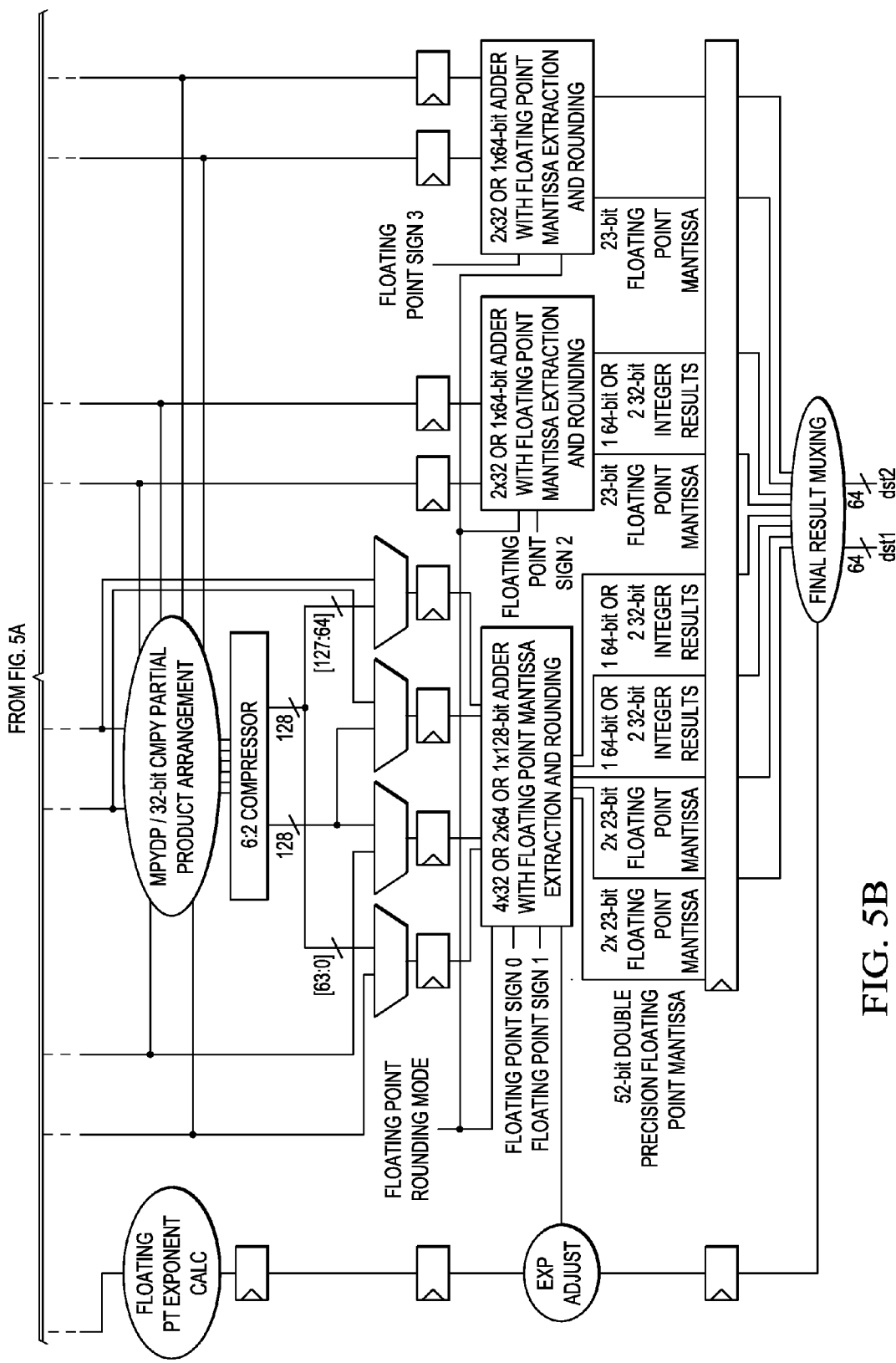

The full block diagram of the multiplier described in this invention is shown in FIG. 5

The operations performed by the multiplier are shown in Table 2:

TABLE 2

| Mnemonic | description |
| --- | --- |
| DCMPY | 2-way SIMD version of CMPY |
| DCCMPY | 2-way SIMD version of CMPY, with conjugate of one operand |
| DCMPYR1 | 2-way SIMD version of CMPYR1 |
| DCCMPYR1 | 2-way SIMD version of CMPYR1 with conjugate of 1 operand |
| CMATMPYR1 | 1 × 2 complex vector times 2 × 2 Complex Matrix, giving 2 32-bit complex results |
| CCMATMPYR1 | Conjugate of 1 × 2 vector times 2 × 2 Complex Matrix, giving 2 32-bit complex results |
| CMATMPY | 1 × 2 complex vector times 2 × 2 Complex Matrix, giving 2 64-bit complex results |
| CCMATMPY | Conjugate of 1 × 2 complex vector times 2 × 2 Complex Matrix, giving 2 64-bit complex results |
| QSMPY32R1 | 4-way SIMD version of SMPY32R1 |
| CMPY32R1 | 32-bit complex multiply of Q31 numbers with rounding (32-bit real and 32-bit imaginary format) |
| CCMPY32R1 | 32-bit complex conjugate multiply of Q31 numbers with rounding |
| QMPY32 | 4-way SIMD version of MPY32 |
| DSMPY2 | SIMD version of SMPY2 instruction |
| MPYU2 | Multiply 2 sets of unsigned 16-bit numbers resulting in 4 32-bit unsigned results |
| DMPY2 | Multiply 4 sets of signed 16-bit numbers resulting in 4 32-bit unsigned results |
| DMPYU2 | Multiply 4 sets of unsigned 16-bit numbers resulting in 4 32-bit unsigned results |
| DOTP4H | Multiply 4 signed half-words by another 4 signed half-words and return the sum |
| DOTPSU4H | Multiply 4 signed half-words by another 4 un-signed half-words and return the sum |
| DDOTP4H | 2-Way SIMD version of DOTP4H |
| DDOTPSU4H | 2-Way SIMD version of DDOTP4H |
| DMPYU4 | Multiply 8 unsigned bytes by another 8 unsigned bytes |
| DMPYSU4 | Multiply 8 signed bytes by another 8 unsigned bytes |
| DMPYSP | 2-way SIMD single precision floating point multiply (2 SP float) |
| CMPYSP | Multiply complex numbers (SP real, SP imaginary) |
| QMPYSP | 4-way SIMD version of MPYSP |
| FMPYDP | Double-precision floating point MPY |

The multiplier array takes in two operands, src1 and src2. The src1 and src2 buses are 128-bits wide to support operations such as QMPY32-QMPY32 multiplies the 4 respective 32-bit words in each 128-bit src and returns four 32-bit results.

Not all operations require 128-bit source operands—many take in 64-bit operands, and a few only take 32-bit operands.

In any case, most instructions will send the corresponding word lane of src1 and src2 to each respective multiply cluster. The notable exceptions to the rule are:

Double precision floating point multiply

Complex 32-bit multiply (both 32-bit integer, and 32-bit single precision floating point Matrix multiply–vector*matrix In the above three cases, the lower 64-bits of src2 are duplicated and sent to clusters 2 and 3, and similarly for src1 except for the matrix multiply case (since the matrix is a 128-bit operand on src1).

Each source is sent through masking logic before being sent to the multiplier clusters. There are three different types of masking that occur. The first type is actuated when a double precision multiply operation is taking place. Recall that the double precision floating point format has a 53-bit mantissa, where 52-bits come from the source operand, and the 53$^{rd}$ bit is an implicit 1. The masking logic will zero out bits 63 through 53 of the src1 and src2 operands before sending to the multiply clusters, and will set bit 52 of the incoming operands.

The second type of masking is actuated when single precision multiplies are to be calculated. In this case, bits 31 through 24 of each word in the incoming source operands are set to zero, and bit 23 is set to a 1 before sending to the multiply clusters.

The final type of masking occurs for the DDOTP4H instructions. In this case, the inputs to the cross multipliers (L×H and H×L) are zeroed out. This will be more clear in the description of the multiply cluster operation.

Multiply Cluster Operation

Each multiply cluster receives two 32-bit sources, src1 and src2. Each cluster contains four 16×16 multipliers, which we'll label mpy0, mpy1, mpy2, and mpy3. mpy0 multiplies src1 (15:0)×src2(15:0), mpy1 multiplies src1 (15:0)×src2 (15:0), mpy2 multiplies src1 (15:0)×src2 (31:16), and mpy3 multiplies src1 (31:16)×src2 (15:0). For the sake of brevity, we'll refer to the result of mpy0 as L×L, mpy1 as H×H, mpy2 as L×H, and mpy3 as H×L.

Note that each multiplier array output is not the complete result of "a*b," but rather is the final two compressed products from the Wallace tree. In other words, each multiplier outputs two 32-bit words that when added together will produce the actual product. We'll call these results L×La, L×Lb, H×Ha, H×Hb, etc.

The multiplexers before the 6:2 compressor (adder) are able to present the 6:2 adder several different combinations of the outputs of the multipliers to affect different results. In addition, the 6:2 adder is configurable such that the carries from bit position 31 do not propagate to bit position 32. The six inputs to the 6:2 adder will be referred to as pp0, pp1, ... pp5.

32×32 multiplication is shown in Table 3:

TABLE 3

| Pp0 | HxHa << 32 | LxLa |
| Pp1 | LxHa << 16 |
| Pp2 | HxLa << 16 |
| Pp3 | HxHb << 32 | LxLb |
| Pp4 | LxHb << 16 |
| Pp5 | HxLb << 16 |

Note that there is no space for rounding bits when calculating the 32×32 result, however the QSMPY32R1 instruction requires rounding. This is achieved by inserting a rounding bit inside one of the 16×16 multipliers in the appropriate bit location, and off the critical path so that there is no timing impact.

16-bit real, 16-bit imaginary complex number multiplication is shown in Table 4:

TABLE 4

| Pp0 | HxLa << 32 | ~LxLa |
| Pp1 | LxHa << 32 | HxHa |
| Pp2 | <<rounding vector>> |
| Pp3 | HxLb << 32 | ~LxLb |
| Pp4 | LxHb << 32 | HxHa |
| Pp5 | 0x00000000 |

Note that complex numbers are represented as a 32-bit number, with the upper 16-bits as the real component, and the lower 16-bits as the imaginary component. Therefore, the real portion of the result will be H×H−L×L, and the imaginary portion of the result will be H×L+L×H. The above muxing will produce the complex results out of the 2×32 bit adders following the 6:2 compressor.

In addition, the 6:2 compressor in this case will inject a "+2" carry input into unused locations in the LSBs of the 6:2 adder tree. This carry injection will not affect the critical path. The +2 carry input arises because we need to have a full 2's compliment on both L×La and L×Lb.

16-bit real, 16-bit imaginary complex number multiply, one operand conjugated shown in Table 5:

TABLE 5

| Pp0 | ~HxLa << 32 | LxLa |
| Pp1 | LxHa << 32 | HxHa |
| Pp2 | <<rounding vector>> |
| Pp3 | ~HxLb << 32 | LxLb |
| Pp4 | LxHb << 32 | HxHa |
| Pp5 | 0x00000000 |

This case is similar to the ordinary complex multiplication except that one of the input operands has had it's imaginary portion negated. This changes the equations to Result_real=H×H+L×L Result imaginary=L×H−H×L In this case, the extra +2 must be added from bit position 32. We accomplish this by setting bit 33 in the rounding vector for this case.

All other cases use the 32-bit datapath, and may disable the 32-bit carry in the 6:2 adder (for example when we want to get H×H and L×L as separate results).

Double precision, and 32-bit real, 32-bit imaginary complex number multiplication:

Double precision multiplication is achieved through performing a 64-bit×64-bit multiplication. The 64×64 multiplication is built up from the results from each of the multiply clusters the same way that we build a 32×32 result from the four 16×16 multipliers inside the multiply clusters.

In addition, the 32-bit real, 32-bit imaginary results are handled the same way as the 32-bit cases, just on wider data. This can be seen in the diagram with the final 6:2 adder in front of a 128-bit adder.

In addition, there is a floating point pipeline which is run in parallel to the main datapath, which handles the exponent calculations. The final 2:1 adder may end up incrementing the final exponent. The final result multiplexing will join the exponent, sign, and mantissa when required.

What is claimed is:

1. A multiplier circuit comprising:
a first source input receiving a plurality of N bits of a first instruction specified operand;
a second source input receiving a plurality of N bits of a second instruction specified operand;
a multiply cluster including
a first multiplier having a first input receiving N/2 lower half bits of said first instruction specified operand and a second input receiving N/2 lower half bits of said second instruction specified operand (L×L), a first output generating a first Wallace tree output of a product of said first multiplier (L×La) and a second output generating a second Wallace tree output of said product of said first multiplier (L×Lb),
a second multiplier having a first input receiving N/2 upper half bits of said first instruction specified operand and a second input receiving N/2 upper half bits of said second instruction specified operand (H×H), a first output generating a first Wallace tree output of a product of said second multiplier (H×Ha) and a second output generating a second Wallace tree output of said product of said second multiplier (H×Hb), a third multiplier having a first input receiving N/2 lower half bits of said first instruction specified operand and a second input receiving N/2 upper half bits of said second instruction specified operand (L×H), a first output generating a first Wallace tree output of a product of said third multiplier (L×Ha) and a second output generating a second Wallace tree output of said product of said third multiplier (L×Hb), a fourth multiplier having a first input receiving N/2 upper half bits of said first instruction specified operand and a second input receiving N/2 lower half bits of said second instruction specified operand (H×L), a first output generating a first Wallace tree output of a product of said fourth multiplier (H×La) and a second output generating a second Wallace tree output of said product of said fourth multiplier (H×Lb), first, second, third, fourth, fifth and sixth multiplexers, each having inputs connected to said first and second outputs of each of said first, second, third and fourth multipliers and an output, each selecting for output an instruction specified set of bits of said first and second outputs of each of said first, second, third and fourth multipliers, and a first 6:2 compressor having inputs connected to said outputs of said six multiplexers for adding said outputs of said six multiplexers, generating on a first output a first Wallace tree output of an instruction specified product and generating on a second output a second Wallace tree output of said instruction specified product;

a second compressor having inputs connected to said first and second outputs of said first 6:2 compressor, having an output of a sum of said first Wallace tree output and said second Wallace tree output forming said desired product.

2. The multiplier circuit of claim 1 wherein:

upon an instruction selection of an N×N multiply of said first instruction specified operand and said second instruction specified operand said first multiplexer outputs said first Wallace tree output of said product of said second multiplier (H×Ha) left shifted N bits concatenated with said first Wallace tree output of a product of said first multiplier (L×La) of said first multiplier, said second multiplexer outputs said first Wallace tree output of a product of said first multiplier (L×Ha) left shifted N/2 bits, said third multiplexer outputs said first Wallace tree output of a product of said fourth multiplier (H×La) left shifted N/2 bits, said fourth multiplexer outputs said second output generating a second Wallace tree output of said product of said second multiplier (H×Hb) left shifted N bits concatenated with said second Wallace tree output of said product of said first multiplier (L×Lb), said fifth multiplexer outputs said second output of said third multiplier (L×Hb) left shifted N/2 bits, and said sixth multiplexer outputs said second Wallace tree output of said product of said fourth multiplier (H×Lb) left shifter N/2 bits.

3. The multiplier circuit of claim 1 wherein:

upon an instruction selection of a complex multiply of said first instruction specified operand and said second instruction specified operand, where for each operand an upper N/2 bits are a real component and a lower N/2 bits are an imaginary component said first multiplexer outputs said first Wallace tree output of a product of said fourth multiplier (H×La) left shifted N bits concatenated with an inverse of said first Wallace tree output of a product of said first multiplier (L×La), said second multiplexer outputs said first Wallace tree output of a product of said third multiplier (L×Ha) left shifted N bits concatenated with said first Wallace tree output of a product of said second multiplier (H×Ha), said third multiplexer outputs a rounding vector, said fourth multiplexer outputs said second Wallace tree output of said product of said fourth multiplier (H×Lb) left shifted N bits concatenated with an inverse of said second Wallace tree output of said product of said first multiplier (L×Lb), said fifth multiplexer outputs said second Wallace tree output of said product of said third multiplier (L×Hb) left shifted N bits concatenated with said first Wallace tree output of a product of said second multiplier (H×Ha), and said sixth multiplexer outputs all 0s.

4. The multiplier circuit of claim 1 wherein:

upon an instruction selection of a complex multiply of said first instruction specified operand and said second instruction specified operand with one operand conjugated, where for each operand an upper N/2 bits are a real component and a lower N/2 bits are an imaginary component said first multiplexer outputs an inverse of said first Wallace tree output of a product of said fourth multiplier (H×La) left shifted N bits concatenated with said first Wallace tree output of a product of said first multiplier (L×La), said second multiplexer outputs said first Wallace tree output of a product of said third multiplier (L×Ha) left shifted N bits concatenated with said first Wallace tree output of a product of said second multiplier (H×Ha), said third multiplexer outputs a rounding vector, said fourth multiplexer outputs an inverse of said second Wallace tree output of said product of said fourth multiplier (H×Lb) left shifted N bits concatenated with said second Wallace tree output of said product of said first multiplier (L×Lb), said fifth multiplexer outputs said second Wallace tree output of said product of said third multiplier (L×Hb) left shifted N bits concatenated with said first Wallace tree output of a product of said second multiplier (H×Ha), and said sixth multiplexer outputs all 0s.

* * * * *